United States Patent Office 3,469,848
Patented Sept. 30, 1969

3,469,848
FLUOROCARBON SOUND RECORD
Salvatore S. Mulay, Roslyn Heights, N.Y., assignor to Tri-Point Industries, Inc., Commack, N.Y., a corporation of New York
No Drawing. Filed Apr. 11, 1966, Ser. No. 542,430
Int. Cl. G11b 9/02
U.S. Cl. 274—41          2 Claims

ABSTRACT OF THE DISCLOSURE

A rigid phonograph disc record made essentially of a fluorocarbon plastic selected from the group consisting of polytetrafluoroethylene, polychlorotrifluoroethylene, polyfluoroethylenepropylene, and polyvinylidenefluoride, with or without a stainless steel backing, and specifically the process for making a polytetrafluoroethylene sound record disc with a recessed circular spiral grooved sound track, the process including:
(1) making a laminated record blank;
(2) cutting a spiral groove in said blank;
(3) electroforming a reverse metal pattern on the record disc; and
(4) stripping the metal pattern and utilizing same as a die.

---

This invention relates to sound records such as films, discs, or other bodies in whose surface sound tracks are directly produced or subsequently impressed, and relates more particularly to the use of a thermoplastic fluorocarbon resin from the group consisting of polytetrafluoroethylene, polychlorotrifluoroethylene, polyfluoroethylenepropylene, and polyvinylidenefluoride in the manufacture of such sound records.

Phonograph disc records are usually made by a lengthy process that includes the steps of cutting sound tracks in a plastic or nitrocellulose lacquer coated aluminum disc by means of a sound responsive recording stylus, followed by a succession of electroforming operations to produce metal masters, mothers, and stampers. Masters and stampers are negative reproductions of the original cut plastic record. Masters are made by electrodepositing a thin layer of metal on the surface of the original cut plastic record matrix, stripping the deposited metal from the matrix and backing it up for rigidity. By similar electroforming techniques, a mother is made from the master and serves as the matrix in electroforming the stamper. Stampers are used in dies for injection and compression molding of plastic records with impressed sound tracks.

Serious limitations found with nitrocellulose lacquer and the other plastics usually used to surface sound recording discs include: rapid degradation by the acids, alkalies, and other chemicals and solvents used in the electroforming process; permanent distortion of the sound track or cracking upon stripping away the electrodeposited metal; short life due to dimensional instability and high moisture absorption; and excessive background noise and echo heard when the reproducing stylus or needle rubs against the walls of the sound track on playback. In addition, the aluminum metal substrate often stains and corrodes. Costly rejects have developed in the record industry from the above mentioned deficiencies.

It has been found that replacing nitrocellulose and other plastic surfaced discs with this invention will achieve large cost savings. Tough and durable sound records having extraordinary sound fidelity and exceptional freedom from background noise and echo may now be mass produced by means of this invention. For example, a large number of stampers may now be directly electroformed from the same fluorocarbon plastic cutting, eliminating thereby, two costly intermediate electroforming operations formerly required to make masters and mothers. Rejects are reduced since the tough, flexible, scratch resistant, and non-stick properties of these fluorocarbon plastics facilitates stripping out the electrodeposited metal from the cut sound grooves in the original cutting. High dimensional stability and zero moisture absorption from the atmosphere permit the permanent storage of fluorocarbon plastic cuttings rather than expensive metal masters. Being inherently self-lubricating, sound tracks cut in these fluorocarbon plastic discs are remarkably smooth and free from burrs and ridges. Furthermore, the slippery surface of the sound track permits unlimited playback without wear, background noise, and echo that ordinarily cause loss of sound fidelity in other types of sound records.

Because these fluoroplastics posses unusually high heat resistance coupled with unsurpassed release properties, fluorocarbon plastic sound records cut in relief may be directly used in mold cavities for the injection and compression molding of sound tracks in fluorocarbon and other plastic sound records. This of course would obviate the need for and replace expensive metal stampers. In such applications, during the sound recording process, the recording stylus would be shaped and adapted to cut a sound track in the fluorocarbon plastic surface of the record that projects above the ground plane. A sound record of this configuration is also playable.

Accordingly, it is the object of the present invention to provide a sound recording disc that may be repeatedly used without deterioration as a matrix for directly electroforming metal stampers. Another object is to provide a sound record in which the playing surface at least is tough, flexible, dimensionally stable, non-hygroscopic and capable of reproducing sound with extraordinary fidelity and with exceptional freedom from background noise and echo. A further object is to provide a sound recording disc that may be repeatedly used in a simple economical method for making sound records of improved quality. A further object is to provide a sound record substantially free of the above mentioned deficiencies in heretofore known sound records. A further object is to provide a sound record with a sound track in relief. Further objects of the invention will presently appear as the description proceeds in connection with the appended claims.

The objects of the invention may be realized through the provision of a sound record in which at least that portion of the record in which the sound tracks are located, if not the whole record, is made from a fluorocarbon thermoplastic resin from the group consisting of polytetrafluoroethylene, polychlorotrifluoroethylene, polyfluoroethylenepropylene, and polyvinylidenefluoride. Interpolymers or mixtures of polymers from this class of fluoroplastics may be used if desired. The resins may either be used alone or combined with plasticizers, fillers, coloring materials, softeners, and the like, depending upon the particular use and effect desired, as will be more fully understood by those skilled in the art to which this invention particularly apertains.

In a preferred construction according to this invention, a sound record is made in a platen press by laminating together under heat and pressure between two stainless steel platens, the following materials in the order given: polytetrafluoroethylene film 0.010" thick; polyfluoroethylenepropylene film 0.002" thick; and a stainless steel disc 0.030" thick by 10" diameter. To impart a highly polished finish to the polytetrafluoroethylene surface of the record, the contacting stainless steel planishing plate is finished to less than 8 microinches. During pressing, the upper and lower platens are held at a temperature of 310° F. and 15 tons of pressure is applied to the laminate for 5 minutes. Then the temperature of the platens is reduced to 100° F. while the pressure is increased to 20 tons for 3 minutes. Sound tracks may then be cut in the blank fluorocarbon plastic surfaced disc by means of a sound responsive recording stylus. The resulting sound record may be used as such and repeatedly replayed an unusually great number of times without loss of the original recorded fidelity; or as previously mentioned it may be used as matrix for electroforming masters. In a species of the invention, a soundless track is precut or impressed in the fluorocarbon blank for subsequent finish cutting by means of a sound responsive recording stylus. Sound tracks also are added to the fluorocarbon blank by softening and pressing with a master die. Sound records may be molded from polychlorotrifluoroethylene, polyfluoroethylenepropylene, and polyvinylidenefluoride by conventional injection, compression, and transfer molding procedures. Because of its high melt viscosity, polytetrafluoroethylene is molded by compacting powder at room temperature to the contour and size of the finished sound record using pressures from 2,000 to 10,000 pounds per square inch. The preform is then sintered at approximately 690° F.; or while still in the jel state, it may be transferred to a hot coining die and pressed to final dimensions while cooling. After sintering, the record can be quenched to obtain minimum crystallinity, or slow cooled to provide higher (and varying) levels of crystallinity.

It is not essential to the present invention that the above steps for making a fluorocarbon sound record be carried out exactly as given; for, a great many methods now employed in the molding of fluoroplastic materials may be utilized with equally good results. For example, the fluoroplastic surface may be applied to the substrate by means such as: lubricated molding of granular fluorocarbon resin; fluidized bed processing; and by dispersion coating. A final planishing press operation will provide the fluorocarbon plastic surface with the required finish of 2 to 8 microinches. One- or two- side sound records may be made by this invention.

The fluorocarbon materials to which the invention is applicable principally comprises the four tough fluoroplastics with extremely low coefficients of friction as mentioned above (polytetrafluoroethylene, polychlorotrifluoroethylene, polyfluoroethylenepropylene, and polyvinylidenefluoride). However, the invention is of especial use with polytetrafluoroethylene, since this material is particularly well suited to the manufacture of sound records that are essentially free from background noise and echo. It has the lowest coefficient of friction of any known plastic.

These fluoroplastics are paraffinic hydrocarbon polymers in which all or a substantial part of the hydrogen atoms have been replaced with fluorine atoms, and in one polymer a chlorine atom is part of the monomer structure. The forces binding the carbon and fluorine together provide one of the strongest known chemical linkages. The fluorine atoms are of such size that they form a tight protective cover over the chain of carbon atoms, not unlike a smooth impenetrable shield. Intermolecular forces are markedly lower and molecular chain lengths are much longer than in other plastics. As a result of the molecular arrangement of these fluoroplastics, shearing occurs at the interface of mating materials rather than within their bulk; their coefficients of friction are unusually very low; they have inherent anti-stick qualities and good abrasion and wear resistance; they have remarkable vibration and acoustical dampening properties; and they have unusual thermal and chemical resistance. These characteristics make these fluorocarbon sound records superior in quality to any known today.

During recording, a sound track consisting of 200 grooves per inch is commonly cut in the plastic surface of the blank record. These grooves may be 0.003" wide, 0.0015" deep, and separated from each other by a 0.002" wide land. The grooves in stereophonic records may be ½ mil wide and ¼ mil deep. Durable sound tracks are readily formed in these fluorcarbon plastics because of their toughness and degree of hardness. Never before has any other material used in the construction of sound records successfully combined the following characteristics now found in sound records made with these fluorocarbon plastics: groove walls with smooth, self-lubricating, anti-stick surfaces that eliminate background noise that would ordinarily occur when the playing stylus slides in the sound track during playback; tough, thin elastic walls between grooves that are free from brittleness and cold flow; high density and uniformity that suppresses mechanical vibration and echo between closely spaced grooves; good cutting qualities, the generation of a continuous chip by the cutting stylus with no horn ridging the land surface; and little resistance to the lateral motion of the cutting stylus thereby providing excellent frequency response.

Properties of the fluorocarbon plastics mentioned herein, such as toughness, hardness, abrasion resistance, and cutting qualities are related to their degree of crystallization. Percent crystallinity refers to the percent by weight of polymer chains fitted in a close packed arrangement. The degree of crystallinity is controlled by molecular weight and by the length of time during fabrication that the fluoroplastic is maintained within the temperature range for rapid crystallization. By rapidly cooling the fluorocarbon plastic through this critical temperature range during processing or annealing (example 585 to 620° F. for polytetrafluoroethylene) many small crystals result which render the plastic tough, transparent, and comparatively flexible and soft. On the other hand, slow cooling will promote the formation of larger crystals and crystal aggregates that render the fluoroplastic harder and more rigid. Practical crystallinity limits for polytetrafluoroethylene range from 46 to 70%.

For special purpose sound records, it may be necessary to modify the fluorocarbon materials mentioned herein by the addition of small quantities of other constituents. Material properties such as wear, creep resistance, stiffness, hardness, and dimensional stability may be increased substantially, while the coefficient of thermal expansion may be markedly decreased by the addition of small amounts of filler materials such as graphite, molybdenum disulfide, glass fiber, and ceramics. Other polymers and resins may be blended or mixed with the fluorocarbon resin to achieve certain desirable effects. For example, the addition of 5% by weight of molybdenum disulfide to polytetrafluoroethylene decreases the coefficient of thermal expansion without appreciably impairing the desirable frictional characteristics of the fluorocarbon.

In the manufacture of a fluorocarbon sound record, the bond strength between the polytetrafluoroethylene surface and the aluminum substrate may be improved by first etching the fluoroplastic. Polyethylene or some other suitable bonding agent may be used at the interface in place of the polyfluoroethylenepropylene. A stainless steel disc having superior resistance to the processing chemicals and greater rigidity in thin sections may be used as a substrate in place of aluminum. Stiff non-metallic materials such as epoxy-fiberglass laminate also may be used as a backing for the fluorocarbon plastic record surface; or for certain sound records the fluorocarbon plastic with an impressed sound track may be used with no backing.

From the above disclosure, it will be appreciated that any sound record consisting wholly or in part of a thermoplastic fluorocarbon resin from the group consisting of polytetrafluoroethylene, polychlorotrifluoroethylene, polyfluoroethylenepropylene, and polyvinylidenefluoride, or their homologues or derivatives with similar properties, with or without addition agents, fillers, colorants, and plasticizers, will come within the scope of this invention without sacrificing any of its advantages.

While the invention has been described in its preferred embodiments, many apparently widely different embodiments of this invention may be made without departing from the spirit and scope thereof.

What is claimed:
1. A process for producing a polytetrafluoroethylene-stainless steel phonograph disc record blank which comprises the steps of:
   (1) laminating together between two stainless steel planishing plates for about 3 to 10 minutes at a temperature in the range of about 300 to 350 degrees Fahrenheit and a pressure in the range of about 100 to 500 p.s.i.g. with at least one of said planishing plates being finished to about 2 to 8 microinches a disc of polytetrafluoroethylene plastic from about 5 to 15 mils thick, a stainless steel disc from about 15 to 30 mils thick, and a disc of polyfluoroethylene-propylene film from about 1 to 5 mils thick interspaced between said polytetrafluoroethylene plastic and said stainless steel disc to effect a bond between said materials; and,
   (2) reducing the temperature of the platens in (1) to a temperature in the range of about 90 to 110° F. while increasing the pressure on the laminate to about 300 to 600 p.s.i.g. and holding said pressure for about 3 to 5 minutes.
2. A process for producing a polytetrafluoroethylene phonograph disc record with a recessed circular sound track which comprises the steps of:
   (1) cutting a flat spiral circular sound groove by sound responsive recording means in the finished surface of the disc record blank of claim 1;
   (2) electroforming a reverse metal pattern on the sound record of step (1);
   (3) stripping the metal pattern from the sound record in (2) and inserting same as a die; and
   (4) molding said polytetrafluoroethylene phonograph disc record.

References Cited

UNITED STATES PATENTS

| | | | |
|---|---|---|---|
| 3,355,347 | 11/1967 | Habermann | 161—189 |
| 3,276,946 | 10/1966 | Cole et al. | 161—189 |
| 3,133,854 | 5/1964 | Simms | 161—189 |
| 2,606,851 | 8/1952 | O'Mahony et al. | 274—42 |
| 2,563,414 | 8/1951 | Parker | 260—27 |
| 2,008,092 | 7/1935 | Biber | 274—46 |
| 1,994,093 | 3/1935 | Billings | 18—48.3 |

LEONARD FORMAN, Primary Examiner

F. J. D'AMBROSIO, Assistant Examiner

U.S. Cl. X.R.

156—309; 161—42